US007321945B2

(12) United States Patent
Kataoka (10) Patent No.: US 7,321,945 B2
(45) Date of Patent: Jan. 22, 2008

(54) INTERRUPT CONTROL DEVICE SENDING DATA TO A PROCESSOR AT AN OPTIMIZED TIME

(75) Inventor: Toshihiko Kataoka, Zama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 10/811,410

(22) Filed: Mar. 26, 2004

(65) Prior Publication Data
US 2004/0225789 A1 Nov. 11, 2004

(30) Foreign Application Priority Data
Mar. 28, 2003 (JP) ............... 2003-092644

(51) Int. Cl.
*G06F 13/24* (2006.01)
*G06F 3/00* (2006.01)
*G06F 5/00* (2006.01)
(52) U.S. Cl. ............... 710/260; 710/58; 710/59
(58) Field of Classification Search ........ 710/260–269, 710/58, 59
See application file for complete search history.

(56) References Cited

U.S. PATENT DOCUMENTS

| 5,671,365 | A | * | 9/1997 | Binford et al. | ............ | 710/100 |
| 5,881,296 | A | * | 3/1999 | Williams et al. | ............ | 710/263 |
| 6,061,305 | A | * | 5/2000 | Williams | ............ | 368/113 |
| 6,115,776 | A | * | 9/2000 | Reid et al. | ............ | 710/260 |
| 6,167,480 | A | * | 12/2000 | Williams et al. | ............ | 710/260 |
| 6,185,639 | B1 | * | 2/2001 | Kailash et al. | ............ | 710/48 |
| 6,338,111 | B1 | * | 1/2002 | Stevens | ............ | 710/260 |
| 6,397,282 | B1 | * | 5/2002 | Hashimoto et al. | ............ | 710/260 |

(Continued)

FOREIGN PATENT DOCUMENTS

JP 10-275136 10/1998

OTHER PUBLICATIONS

Constantinos Dovrolis, Brad Thayer, Parameswaran Ramanathan, "HIP: Hybrid Interrupt-Polling for the Network Interface", 2001, ACM SIGOPS Operating Systems Review, ACM Press, vol. 35, Issue 4, pp. 50-60.*

(Continued)

Primary Examiner—Mark H. Rinehart
Assistant Examiner—Faisal Zaman
(74) Attorney, Agent, or Firm—Ronald V. Davidge; Carlos Munoz-Bustamante (57) ABSTRACT

An interrupt control device for issuing interrupts to a central processing unit (CPU) includes an object acquiring unit for acquiring data or resource(s) for use by the CPU and an interrupt issuing unit for issuing interrupts to the CPU. The interrupt issuing unit issues each interrupt to the CPU before the object acquiring unit actually acquires the data or the resource, but the interrupt indicates that the data or the resource is available. The interrupt control device further includes a use delay unit for delaying the use of the data or resource by the CPU unit until the object acquiring unit acquires the data or the resource if the CPU which has received the interrupt requests the use of the data or the resource before the object acquiring unit acquires the data or the resource. By adjusting the exact timing of the issuance of the interrupt according to the actual delays experienced by the CPU, the overall delays associated with interrupt handling are minimized.

15 Claims, 6 Drawing Sheets

U.S. PATENT DOCUMENTS

| | | | |
|---|---|---|---|
| 6,629,179 B1* | 9/2003 | Bashford | 710/260 |
| 6,640,274 B1* | 10/2003 | Huffman et al. | 710/260 |
| 6,721,878 B1* | 4/2004 | Paul et al. | 712/244 |
| 6,754,738 B2* | 6/2004 | Brice et al. | 710/48 |
| 2004/0236875 A1* | 11/2004 | Jinzaki | 710/15 |

OTHER PUBLICATIONS

"Computer Dictionary", 1994, Microsoft Press, Second Edition, p. 339.*

Nakashima et al., "An Accurate and Efficient Simulation-based Analysis for Worst Case Interruption Delay", Oct. 2006, ACM Press, Proceedings of the 2006 international conference on Compilers, architecture and synthesis for embedded systems, pp. 2-12.*

Van der Wijngaart et al., "The Effect of Interrupts on Software Pipeline Execution on Message-Passing Architectures", Jan. 1996, ACM Press, Proceedings of the 10th international conference on Supercomputing, pp. 189-196.*

Regehr et al., "Preventing Interrupt Overload", Jun. 2005, ACM Press, Proceedings of the 2005 ACM SIGPLAN/SIGBED conference on Languages, compilers, and tools for embedded systems, pp. 50-58.*

De Gloria et al., "A Self Timed Interrupt Controller: A Case Study in Asynchronous Micro-Architecture Design", Sep. 1994, IEEE, ASIC Conference and Exhibit, 1994. Proceedings., Seventh Annual IEEE International, pp. 296-299.*

* cited by examiner

INTERRUPT CONTROL DEVICE SENDING DATA TO A PROCESSOR AT AN OPTIMIZED TIME

BACKGROUND OF THE INVENTION

1. Field of the Invention

The present invention relates to an interrupt control device for use with an information processing device, along with methods for controlling such an interrupt control device and program products for executing such methods. In particular, the present invention relates to such devices, methods and program products for optimizing the timing of interrupts to a central processing unit of the information processing device.

2. Background

When an input/output (I/O) device or sub-CPU (Central Processing Unit) operates together with a main CPU to perform data processing operations or control, the input/output device or sub-CPU typically issues an interrupt to the main CPU to operate in synchronization with the main CPU (see, for example, Published Unexamined Patent Application No. JP10-275136).

Using such a methodology, it can take an ISR (Interrupt Service Routine) considerable time to start up and operate after an OS (Operating System) running on the CPU receives an interrupt, resulting in performance degradation due to delays in data transfer or synchronization between the main CPU and an input/output device or a sub-CPU.

One approach to avoiding such delay is to poll I/O devices and sub-CPUs from the main CPU to monitor them, instead of waiting for interrupts. However, it is difficult for the main CPU to efficiently perform other jobs during polling, causing other, polling-related delays and further performance degradation.

Therefore, an object of the present invention is to provide an information processing device, an interrupt control device and method, and a program product for implementing such methods, to address the stated shortcomings of the prior art. This object is achieved by the combination of features set forth in the independent claims appended hereto. Other, specific and alternate embodiments of the present invention are set out in the dependent claims, also appended hereto.

SUMMARY OF THE INVENTION

In accordance with an embodiment of the present invention, an interrupt control device issuing an interrupt to a central processing unit is provided which comprises an object acquiring unit for acquiring data or resource(s) for use by the central processing unit, an interrupt issuing unit for issuing an interrupt to the central processing unit before the object acquiring unit acquires the data or the resource, the interrupt indicating that the data or the resource has become available, and a use delay unit for delaying the use of the data or resource by the central processing unit until the object acquiring unit acquires the data or the resource if the central processing unit which has received the interrupt requests the use of the data or the resource before the object acquiring unit acquires the data or the resource.

One aspect of embodiments of the present invention include the interrupt control device further comprising a setup period change unit for adjusting, over time, the period of time between the recognition of the need for the interrupt and the actual issuance of the interrupt. This adjustment leads to an optimization of the interrupt timing to minimize the interrupt handling delays experienced by the CPU and the I/O or other devices communicating with the CPU.

Other aspects of embodiments of the present invention include an information processing device comprising the interrupt control device and the central processing unit, interrupt control methods incorporating elements of the interrupt control device described above and program products for implementing such methods.

The present invention will be described below with respect to preferred embodiments of the present invention. However, the following description of the embodiment is not intended to limit the present invention defined in the claims and not all combinations of the features described in these embodiments are essential to the solution according to the present invention.

BRIEF DESCRIPTION OF THE DRAWINGS

Embodiments of the present invention will be described in some detail in the following specification and with reference to the following figures in which like elements are referred to using like reference numbers and in which:

FIG. 5 shows examples of the timing of operations in an information processing device according to an embodiment of the present invention in which;

FIG. 5 (*a*) shows the timing in a case where data generation/resource reservation by the information processing subsystem ends before the CPU requests the use of the data/resource, and FIG. 5 (*b*) shows the timing in a case where data generation/resource reservation by the information processing subsystem ends after the CPU requests the use of the data/resource.

DETAILED DESCRIPTION OF EMBODIMENTS OF THE PRESENT INVENTION

Figure 1:
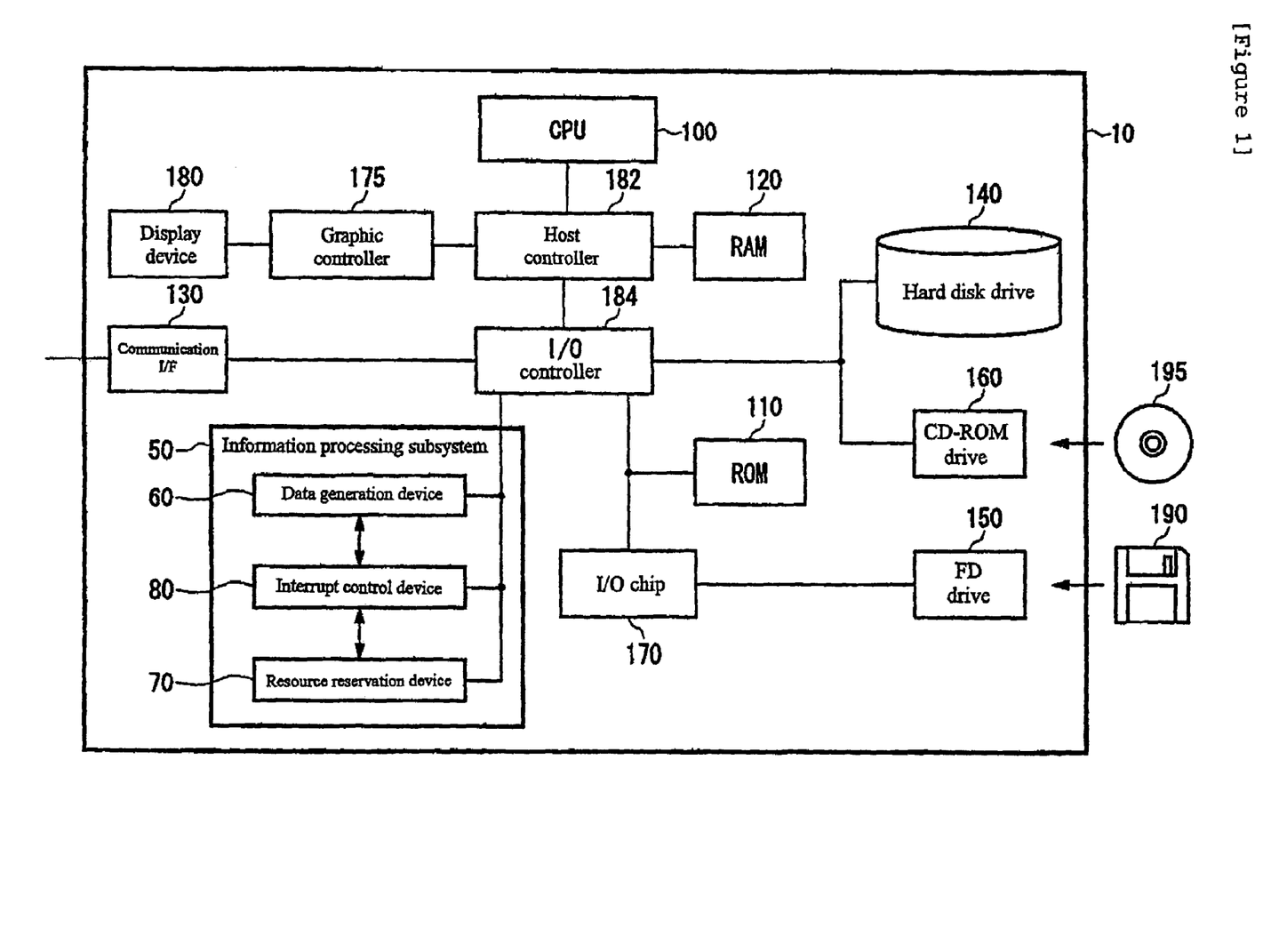
FIG. 1 shows a hardware configuration of an information processing device according to an embodiment of the present invention.

FIG. 1 shows a hardware configuration of an information processing device 10 according to the present embodiment. In the information processing device 10 according to the present embodiment, an information processing subsystem 50 issues an interrupt to a CPU 100 before data or resource to be used by the CPU 100 becomes available. This masks the latency between the time the interrupt is issued and the time the CPU 100 starts interrupt handling, thereby alleviating system degradation due to the interrupt overhead.

The information processing device 10 according to the present embodiment comprises a CPU section including the CPU 100, a RAM 120, a graphic controller 175, and a display device 180, which are interconnected through a host controller 182, an input/output section including a communication interface 130, a hard disk drive 140, a CD-ROM drive 160, and information processing subsystem 50, which are connected to the host controller 182 through an input/output controller 184, and a legacy input/output section including a ROM 110, a flexible disk drive 150, and input/output chip 170, which are connected to the input/output controller 184.

The host controller 182 connects the RAM 120 with the CPU 100 and the graphic controller 175, which access the RAM 120 at a high transfer rate. The CPU 100 operates according to programs stored in the ROM 110 and the RAM 120 to control the components. The graphic controller 175 obtains image data generated by the CPU 100 on a frame buffer provided in the RAM 120 and displays it on the display device 180. Alternatively, the graphic controller 175 may include an internal frame buffer for storing image data generated by the CPU 100.

The input/output controller 184 connects the host controller 182 with the communication interface 130, the hard disk drive 140, the CD-ROM drive 160, and the information processing subsystem 50, which are relatively fast input/out devices. The communication interface 130 provides communication with other devices through a network. The hard disk drive 140 stores programs and data used by the CPU 100. The CD-ROM drive 160 reads a program or data from the CD-ROM 195 and provides it to the RAM 120 and/or the hard disk drive 140.

The information processing subsystem 50 cooperates with the CPU 100 to perform information processing. The information processing subsystem 50 includes a data generation device 60 that generates data to be used by the CPU 100, a resource reservation device 70 that reserves a resource to be used by the CPU 100, and a interrupt control device 80 that issues an interrupt to the CPU 100 in order to let the CPU 100 use the data generated by the data generation device 60 or the resource reserved by the resource reservation device 70.

The information processing subsystem 50 in the present embodiment includes a DSP (Digital Signal Processor), which is a sub-CPU performing information processing in cooperation with the CPU 100. The data generated by the data generation device 60 for use by the CPU 100 may be data to be provided from the information subsystem 50 to the CPU 100, including data generated as a result of instruction processing by the DSP and data indicating the status of the information processing subsystem 50. The resource reserved by the resource reservation device 70 for use by the CPU 100 may be a hardware resource and/or software resource, including a storage area for storing data to be provided from the CPU 100 to the DSP, a memory area and I/O area accessible by the DSP, the right to use the DSP, and the right of exclusive operation to be obtained by a program executed by the CPU 100.

Alternatively, the data generation device 60 and the resource reservation device 70 may be an interface that connects input/output devices to the input/output controller 184. In that case, the data generated by the data generation device 60 for use by the CPU 100 may be data to be transferred from the information subsystem 50 to the CPU 100, RAM 120, or the hard disk drive 140, including data received by the data generation device 60 from an input/output device and buffered in the information processing subsystem 50 and data indicating the status of input/output devices. The resource reserved by the resource reservation device 70 for use by the CPU 70 may be a hardware resource and/or software resource, including an input/output device, the right for using an input/output device, and an entry of a data buffer for buffering data to be sent to a device external to the information processing device 10.

Connected to the input/output controller 184 are the ROM 110 and relatively slow input/output devices such as the flexible disk drive 150 and the input/output chip 170. The ROM 110 stores programs such as a boot program that is executed by the information processing device 10 when it is activated and programs that are dependent on the hardware of the information processing device 10. The flexible disk drive 150 reads a program or data from a flexible disk 190 and provides it to the CPU 100 and /or the hard disk drive 140 through the input/output controller 184. The input/output chip 170 provides connection with the flexible disk 190 and with various input/output devices through a parallel port, serial port, keyboard port, and mouse port.

A program to be provided by a user to the CPU 100 through the RAM 120 is stored in a recording medium such as a flexible disk 190, CD-ROM 195, or IC card. The program is read from the recording medium, installed into the information processing device 10 through the input/controller 184 and the RAM 120, and executed in the CPU 100.

A program to be provided by a user to the information processing subsystem 50 through the RAM 120 is stored in a recording medium such as a flexible disk 190, CD-ROM 195, or IC card. The program is read from the recording medium, installed in the information processing subsystem 50 through the input/output controller 184 and the RAM 120, and executed in the information processing subsystem 50.

These programs or modules may be stored in an external storage medium. The storage medium may be an optical recording medium such as a DVD or a PD, a magneto-optical recording medium such as an MD, a tape medium, or a semiconductor memory such as an IC card, other than the flexible disk 190 and the CD-ROM 195. Alternatively, the program may be stored in a storage device such as a hard disk or RAM provided in a server system connected to a private communication network or the Internet and provided to the information processing device 10 over the network.

Figure 2:
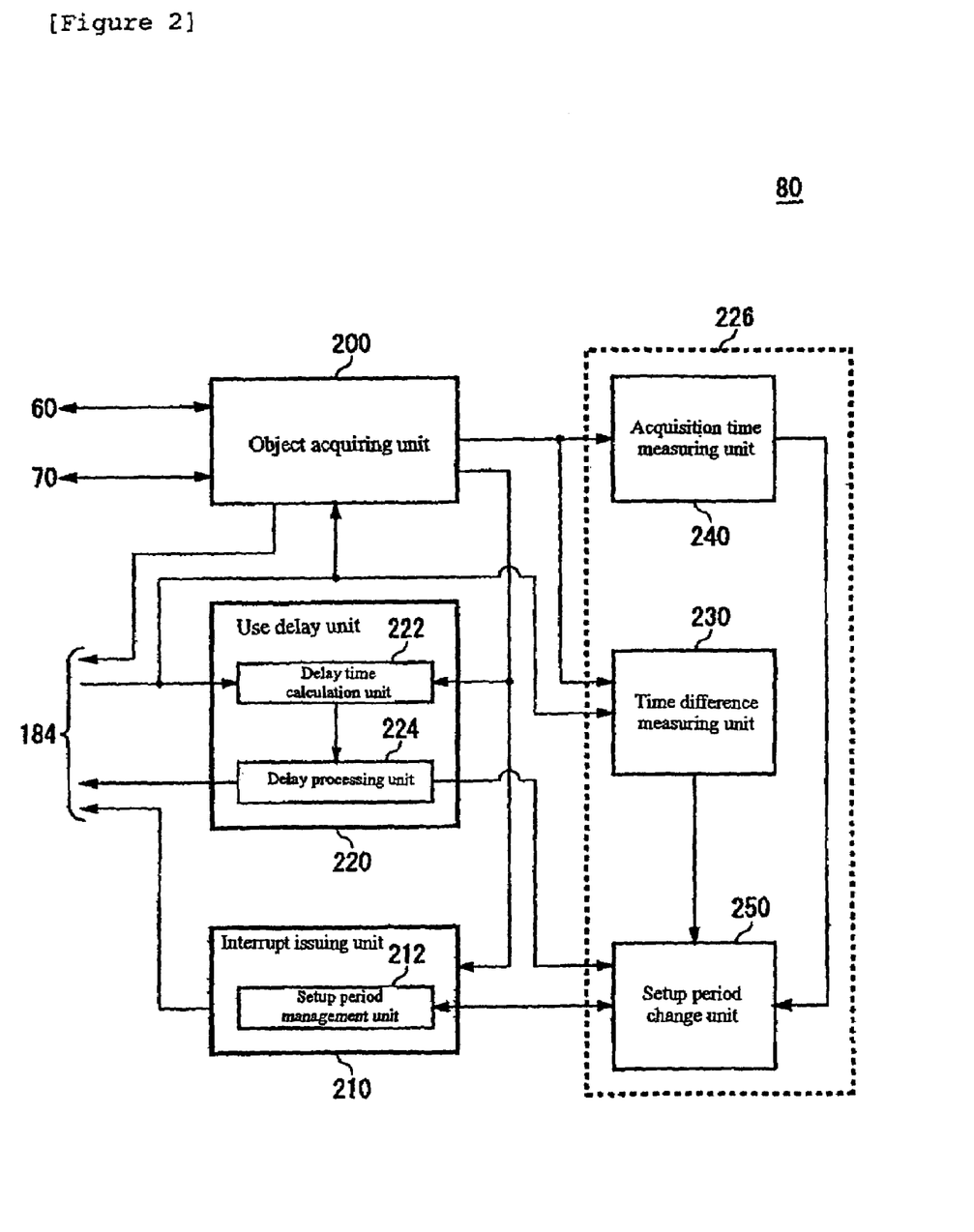
FIG. 2 shows a functional configuration of an interrupt control device according to an embodiment of the present invention.

FIG. 2 shows a functional configuration of the interrupt control device 80 according to the present embodiment. The interrupt control device 80 includes an object acquiring unit 200, an interrupt issuing unit 210, a use delay unit 220, and a timing control unit 226.

The object acquiring unit 200 acquires data generated by the data generation device 60 or resource reserved by the resource reservation device 70 for use by the CPU 100.

The interrupt issuing unit 210 issues an interrupt indicating that data or resource is becoming available to the CPU 100, before the object acquiring unit 200 acquires that data or resource. In the present embodiment, the interrupt issuing unit 210 includes a setup period management unit 212 that manages the setup period between the time the data generation device 60 starts generating data or the resource reservation device 70 starts reserving a resource and the time the interrupt issuing unit 210 issues an interrupt.

The interrupt issuing unit 210 issues the interrupt indicating that a data or resource is becoming available to the CPU 100 after the predetermined setup period starting from the time the data generation device 60 starts generating the data or the resource reservation device 70 starts reserving the resource but before the object acquiring unit 200 acquires that data or resource.

The use delay unit 220 delays the use of data or resource by the CPU 100 until the object acquiring unit 200 acquires the data or resource if the CPU 100 receives an interrupt indicating the data or resource has become available and requests the use of the data or resource but the object acquiring unit 200 has not yet acquired the data or resource.

The use delay unit 220 includes a delay time calculation unit 222 and a delay processing unit 224.

The delay time calculation unit 222 receives information about the progress of data generation or resource reservation from the object acquisition unit 200. When the delay time calculation unit 222 receives a request for using the data or resource from the CPU 100, the delay time calculation unit 222 calculates the delay time required for the object acquiring unit 200 to acquire the data or resource.

The delay processing unit 224 selects a delay means from among a plurality of different delay means that delays the use of the data or resource by CPU 100. The delay processing unit 224 then uses the selected delay means to delay the use of the data or resource by the CPU 100.

The timing control unit 226 controls the timing for the interrupt issuing unit 210 to issue an interrupt so that the time the CPU 100 which has received an interrupt requests the use of data or resource substantially matches the time that the object acquiring unit 200 acquires the data or resource. The timing control unit 226 includes a time difference measuring unit 230, an acquisition time measuring unit 240, and a setup period change unit 250.

The time difference measuring unit 230 measures the time difference between the time the object acquiring unit 200 acquires data or resource and the time the CPU 100 which has received an interrupt requests the use of that data or resource. The time difference measuring unit 230 may also measure latency between the time the interrupt is issued to the CPU 100 and the time the CPU 100 which has received the interrupt requests the use of the data or resource.

The acquisition time measuring unit 240 measures the acquisition time from the time the data generation device 60 starts generating data or resource reservation device 70 starts reserving a resource until the object acquiring unit 200 unit acquires the data or resource.

The setup period change unit 250 changes the setup period managed by the setup period management unit 212 according to the time difference measured by the time difference measuring unit 230 and the acquisition time measured by the acquisition time measuring unit 240.

In the configuration described above, an interrupt that indicates data or resource has become available is issued, for example, in the cases described below.

(1) In the case of data transfer between the information processing subsystem 50 and the CPU 100:

When the information processing subsystem 50 sends data to the CPU 100, the data generation device 60 generates the data and the interrupt control device 80 issues an interrupt indicating that the data has become available to the CPU 100. The data generated by the data generation device 60 may be stored in a storage area such as memory or a data buffer, for example, in the information processing subsystem 50 that is accessible to the CPU 100.

When the information subsystem 50 receives data from the CPU 100, the resource reservation device 70 reserves a resource such as a storage area to store the received data and the interrupt control device 80 issues to the CPU 100 an interrupt indicating that the CPU 100 can send the data. In response to the interrupt, the CPU 100 stores the data to be sent in the resource such as the storage area reserved by the resource reservation device 70, thereby sending the data to the information processing subsystem 50.

(2) In the case of allowing the CPU 100 to use a resource in the information processing subsystem 50:

In order to allow the CPU 100 to use a resource in the information processing subsystem 50, the resource reservation device 70 reserves the resource and the interrupt issuing device 80 issues an interrupt indicating that the resource has become available to the CPU 100. When receiving the interrupt, the CPU 100 uses the resource in the information processing subsystem 50.

In order to cause the CPU 100 to release the resource the CPU 100 has occupied in the information processing subsystem 50, the resource reservation device 70 reserves the resource to be released as a resource to be newly reserved by the CPU 100. The interrupt control device 70 issues an interrupt to the CPU 100 that causes the CPU 100 to release the resource and indicates to the CPU 100 that the CPU 100 may again use the resource. When receiving this interrupt, the CPU 100 releases the resource and requests to use the resource again, if necessary. The interrupt control device 80 does not allow the CPU 100 to use the resource until the resource reservation device 70 reserves the resource once again.

More specifically, the interrupt control device 80 issues an interrupt for releasing a storage area in the information processing subsystem 50 to the CPU 100 when the CPU 100 is using the storage area. When receiving the interrupt, the CPU 100 performs a process for releasing the storage area. When a process other than the process for releasing the storage area requests the use of that resource, the interrupt control device 80 makes the CPU 100 wait until the resource is released and the resource reservation device 70 newly reserves the resource.

As illustrated above, the interrupt control device 80 makes data transfer between the CPU 100 and the information processing subsystem 50, for example, more efficient and also efficiently makes the CPU 100 reserve or release a resource of the information processing subsystem 50.

In accordance with embodiments of the present invention, the interrupt issuing unit 210 of the interrupt control device 80 described above issues an interrupt to the CPU 100 before data generation or resource reservation is completed. The data generation device 60 or the resource reservation device completes the data generation or resource reservation before the CPU 100, which has received the interrupt, requests the use of data or resource. Thus, delay in use of data or resource due to interrupt latency of an OS running on the CPU 100 can be avoided.

If the CPU 100 requests data or resource before the data or resource is acquired, the use delay unit 220 delays the use of the data or resource by the CPU 100. This can ensure that the interrupt control device 80 allows the CPU 100 to use the data or resource even if interrupt latency changes depending on operating conditions.

The time difference measuring unit 230, the acquisition time measuring unit 240, and the setup period change unit 250 change the setup period so that the interrupted CPU 100 requests data or resource immediately after the object acquiring unit 200 acquires the use of data or resource. This allows the interrupt control device 80 to appropriately control the timing of issuing an interrupt to the CPU 100.

Figure 3:
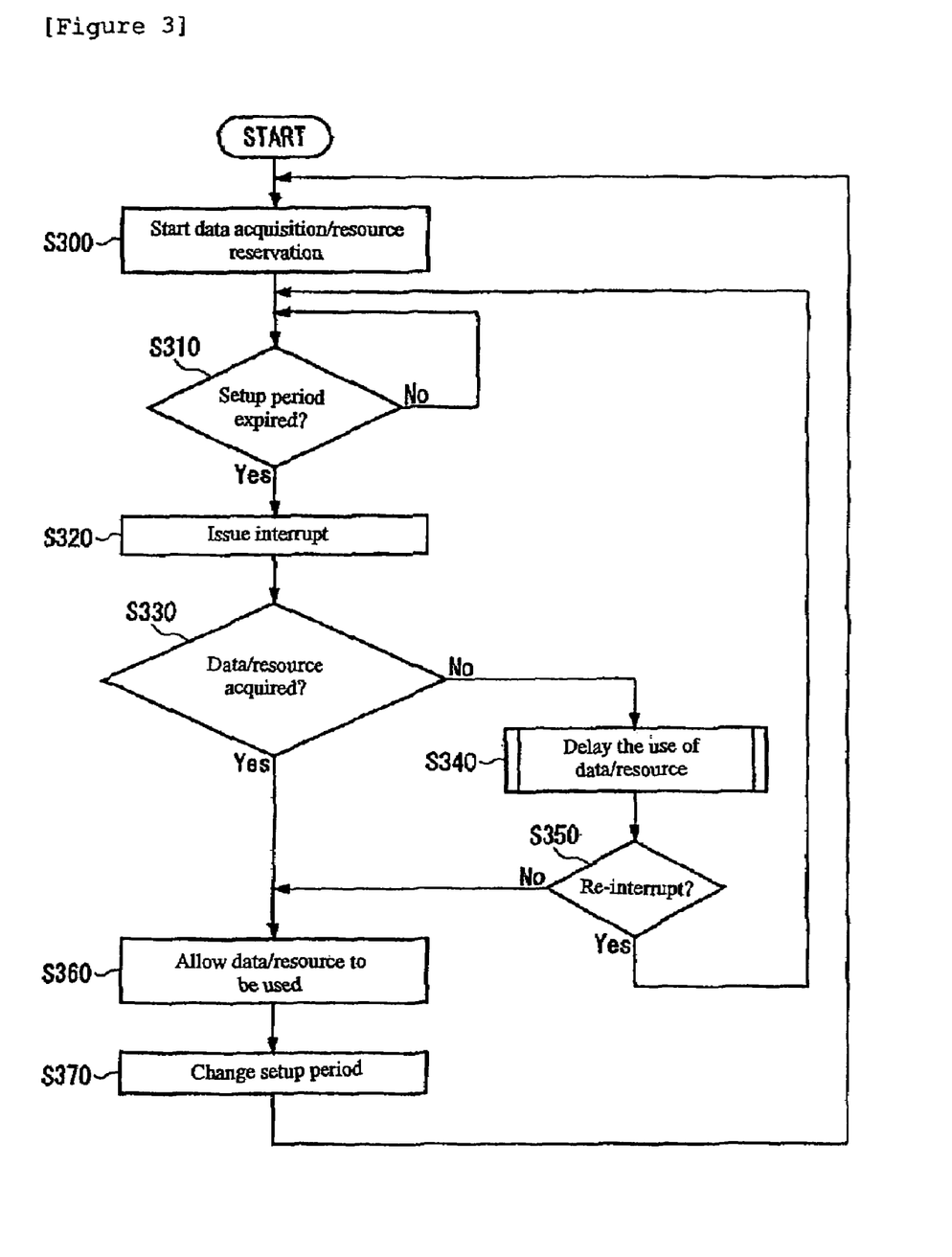
FIG. 3 shows a flowchart of a process performed in an information processing subsystem according to an embodiment of the present invention.

FIG. 3 shows a flowchart of a process performed in the information processing subsystem 50 according to the present embodiment.

First, the data generation device 60 or the resource reservation device 70 starts generating data or reserving a resource (S300). In particular, the data generation device 60, for example, starts an operation such as signal processing for generating the data according to an instruction from the CPU 100, or the resource reservation device 70 starts a process for reading data received from the CPU 100 from a buffer to release a buffer area and reserve the area for the use by the CPU 100.

Then, when the setup period has elapsed since the data generation device 60 or the resource reservation device 70 started the data generation or resource reservation (S310), the interrupt issuing unit 210 issues an interrupt to the CPU 100 that indicates that the data or resource has become available (S320).

For example, an interval timer provided in the input/output chip 170 may be set so that the interrupt issuing unit 210 issues an interrupt to the CPU 100 after the setup period when the data generation device 60 or the resource reservation device 70 starts data generation or resource reservation. Alternatively, the timing of the execution of an instruction for the interrupt issuing unit 210 to issue an interrupt to the CPU 100 may be determined on the basis of the setup period in a program that runs on the information processing subsystem 50 and generates data to be used by the CPU 100. The interrupt issuing unit 210 may be arranged so as to issue an interrupt to the CPU 100 when a part of data to be used by the CPU 100 has been generated. The amount of the part of data may be determined on the basis of the setup period.

The interrupt control device 80 receives a request from the CPU 100, which has received the interrupt, for using the data or resource corresponding to the interrupt. The object acquiring unit 200 acquires the data or resource before or after the CPU 100 requests the use of the data or resource.

If the object acquiring unit 200 has not yet acquired the data or resource at the time the request for using the data or resource is received, the use delay unit 220 delays the use of the data or resource by the CPU 100 (S340). If the delay required for the object acquiring unit 200 to acquire the data or resource is long, the delay processing unit 224 may use a delay technique that causes the CPU 100 to return from the interrupt and then causes the interrupt to be generated again immediately before or after the object acquiring unit 200 acquires the data or resource (S350). In that case, the process returns to step S310.

On the other hand, if the time required for the object acquiring unit 200 to acquire the data or resource is short, the delay processing unit 224 may use a delay technique that causes the CPU 100 to request the data or resource by polling (S350). When the object acquiring unit 200 acquires the data or resource, the process proceeds to step S360.

Next, the use delay unit 220 allows the CPU 100 to use the data or resource obtained by the object acquiring unit 200 (S360). Then the setup period change unit 250 changes the setup period on the basis of a time difference measured by the time difference measuring unit 230 and acquisition time measured by the acquisition time measuring unit 240 (S370) to adjust the timing used by the interrupt issuing unit 210 to issue the next interrupt when data or resource(s) are acquired. Each time a data segment is sequentially generated or when one or more resources are reserved, the information processing subsystem 50 returns to step 300 to perform the process from step 300 to step S370.

At step S370, the setup period change unit 250 may change the setup period on the basis of a plurality of time differences measured by the time difference measuring unit 230 and a plurality of acquisition times measured by the acquisition time measuring unit 240 as a result of a plurality of iterations of the process of FIG. 3.

Figure 4:
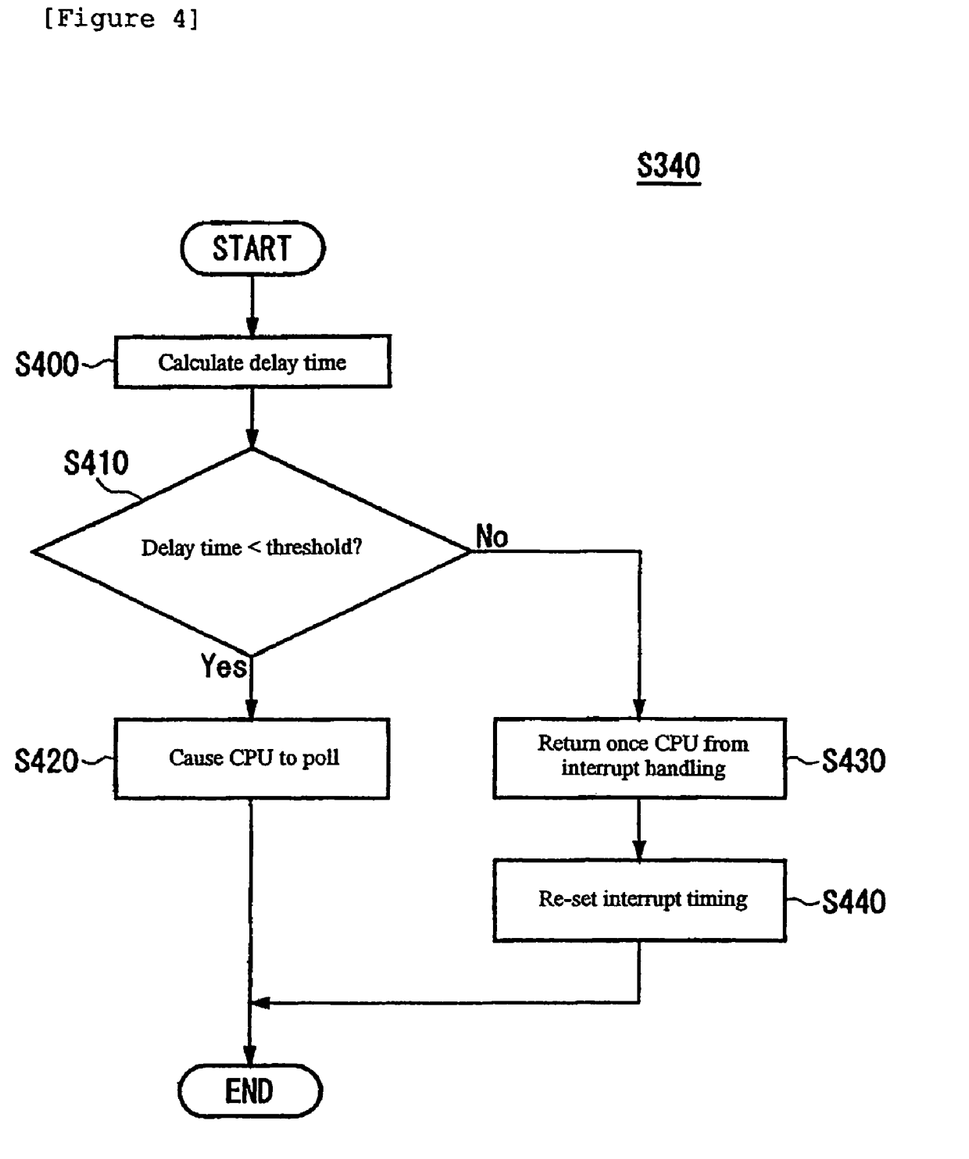
FIG. 4 shows a flowchart of a delay process performed in the information processing subsystem according to an embodiment of the present invention.

FIG. 4 shows a flowchart of a delay process performed at step S340 of FIG. 3 in the information processing subsystem 50 according to the present embodiment.

When the CPU 100 which has received an interrupt requests the use of data or resource corresponding to the interrupt, the delay time calculation unit 222 calculates the time required from the receipt of the request to the acquisition of the data or resource by the object acquiring unit 200 (S400). For example, the delay time calculation unit 222 may calculate the delay time on the basis of the ratio of the amount of data generated by the data generation device 60 before the reception of that request to the amount of the data that the generation device 60 should generate. Alternatively, the delay time calculation unit 222 may calculate the delay time on the basis of the progress of the process performed by the data generation device 60 or the resource reservation device 70.

If the delay time is shorter than a predetermined threshold (S410), the delay processing unit 224 causes the CPU 100 to perform polling to request the data or resource (S420). On the other hand, if the delay time exceeds the threshold (S410), the delay processing unit 224 causes the CPU 100 to return from the interrupt handling (S430). Then the delay processing unit 224 causes the setup period change unit 250 to set the timing of the re-issuance of the interrupt by the interrupt issuing unit 210 so that the interrupt issuing unit 210 re-issues the interrupt to the CPU 100 at a point of time close to the timing of the acquisition of the data or resource by the object acquiring unit 200 (S440). The setup period management unit 212 manages the setup period for the re-interrupt separately from the setup period used at step S300 in FIG. 3.

Step 420 or S440 described above allows the delay processing unit 240 to delay the use of the data or resource by the CPU 100 until the object acquiring unit 200 obtains the data or the resource. The use delay unit 220 can select an appropriate delay means from among delay means for polling delay and re-interrupt delay to minimize the overhead needed for interrupt handling. Alternatively, the use delay unit 220 may select one of more than two delay means depending on delay time.

Figure 5:
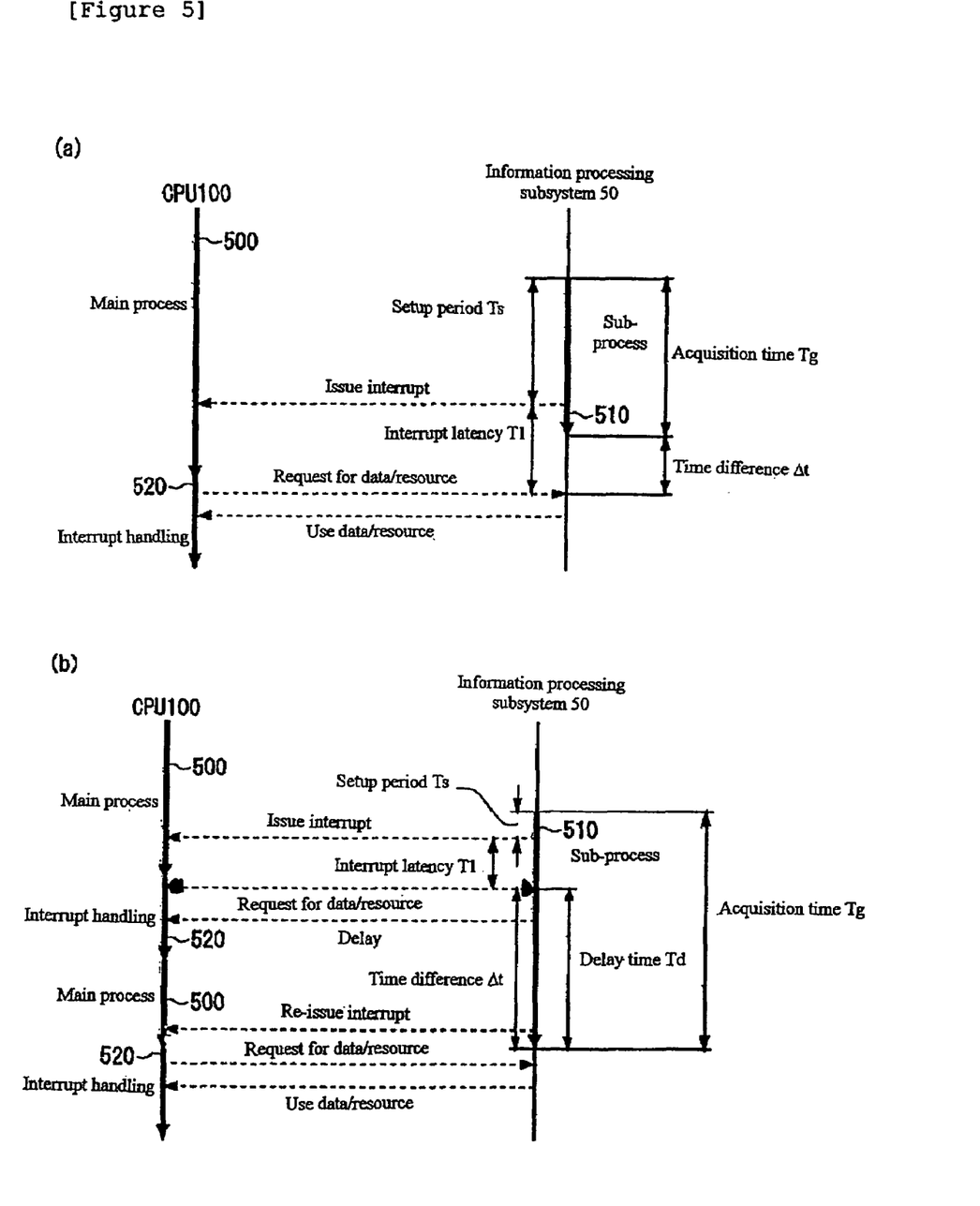

FIG. 5 shows exemplary timings of operations in the information processing device 10 according to the present embodiment.

FIG. 5 (a) shows an example in which data generation or resource reservation by the information processing subsystem 50 ends before the CPU 100 requests the use of the data or resource. FIG. 5 (b) shows an example in which data generation or resource reservation ends after the CPU 100 requests the use of the data or resource.

In FIG. 5, the data generation device 60 or the resource reservation device 70 starts a sub-process 510 for generating data or reserving a resource, concurrently with the main process 500 in the CPU 100. After the setup period Ts elapses, the interrupt issuing unit 210 issues an interrupt to the CPU 100. When receiving the interrupt, the CPU 100 activates interrupt handling 520. Then the CPU 100 requests the use of the data or resource corresponding to the interrupt in the interrupt handling 520 to the information processing subsystem 50. In FIG. 5, Tl indicates latency from the time the interrupt issuing unit 210 issues the interrupt to the time the CPU 100 requests the use of the data or resource corresponding to the interrupt.

The information processing subsystem 50 ends the sub-process 510 after the completion of data generation or resource reservation. The acquisition time measuring unit 240 uses, for example, a real-time clock to measure the generation time Tg elapsing from the time the data generation device 60 or the resource reservation device 70 starts generating data or reserving a resource until the object acquiring unit 200 acquires the data or resource.

If the object acquiring unit 200 has acquired the data or resource at the time the CPU 100 requests the use of the data or resource, the use delay unit 220 allows the CPU 100 to use the data or resource without delay (FIG. 5 (a)). In that case, the time difference Dt measured by the time difference measuring unit is a positive value because the information processing subsystem 50 receives the request for the use of the data or resource after it acquires the data or resource.

On the other hand, if the object acquiring unit 200 has not yet acquired the data or resource at the time the CPU 100 request the use of the data or resource, the use delay unit 220 delays the use of the data or resource by the CPU 100 (FIG. 5 (b)). In that case, the time difference Dt is a negative value because the information processing subsystem 50 receives the request for the use of the date or resource before it acquires the data or resource.

If the delay Td is equal to or greater than a threshold, the delay processing unit 224 first causes the CPU 100 to return from the interrupt handling 520 to the main process 500 and then causes the interrupt issuing unit 210 to re-issue the interrupt after the delay time Td elapses, as shown in FIG. 5 (b), for example.

The setup period change unit 250 may use one of the following methods to adjust the setup period, for example.

(1) Using the average value of time differences measured by the time difference measuring unit 230 to change the setup period.

For example, the setup period change unit 250 may change the setup period Ts so that the average of the time differences Dt becomes substantially zero. In particular, the setup period change unit 250 changes the setup period Ts so that the average value of the time differences Dt becomes a predetermined positive value. The setup period Ts is preferably a small value compared with the interrupt latency Tl. In this way, the setup period change unit 250 can adjust the setup period Ts so that the object acquiring unit 200 receives a request for data from the CPU 100 immediately after the object acquiring unit 200 acquires the data or resource in average cases.

The setup period change unit 250 may calculate the average of the past n time differences or may calculate the weighted average.

(2) Using distribution of time differences measured by the time difference measuring unit 230 to change the setup period.

For example, the setup period change unit 250 changes the setup period Ts so that a predetermined percentage, 90% for example, of time differences Dt becomes approximately zero or less. In particular, the setup period change unit 250 changes the setup period Ts so that a predetermined percentage of time differences Dt becomes a predetermined positive value. The setup period Ts is preferably a small value compared with the interrupt latency Tl. In this way, the setup period change unit 250 can adjust the setup period Ts so that, for the predetermined percentage of interrupts, the CPU 100 can use, without delay, the data or resource that it requests.

(3) Using time differences measured by a time difference measured by the time difference measuring unit 230 to gradually change the setup period.

For example, if the CPU 100 receives an interrupt and requests the use of data or resource before the object acquiring unit 200 acquires the data or resource, the setup period change unit 250 may change the setup period to a smaller value. On the other hand, if the CPU 100 receives an interrupt and requests the use of data or resource after the object acquiring unit 200 acquires the data or resource, the setup period change unit 250 may change the setup period to a larger value. The setup period change unit 250 performs this process for a plurality of interrupts so that the setup period Ts gradually moves closer to an optimum value.

The setup period change unit 250 may set the setup period Ts on the basis of a acquisition time or times Tg, a time difference or differences Dt, and an interrupt latency or latencies Tl in the processing of one or more interrupts. Alternatively, the setup period change unit 250 may set a new setup period Ts on the basis of a setup period or periods Ts and a time difference or differences Dt in the processing of one or more interrupts.

According to the interrupt control device 80 described above, the time difference measuring unit 230, acquisition time measuring unit 240, and setup period change unit 250 in the timing control unit 226 can be used to set an appropriate setup period on the basis of the average or distribution of time differences. Furthermore, the setup period can be gradually made closer to an optimum value on the basis of time differences measured by the time difference measuring unit 230. As a result, the interrupt control device 80 can optimize the timing of interrupts to the CPU 100, thereby reducing system performance degradation due to interrupt overhead.

Figure 6:
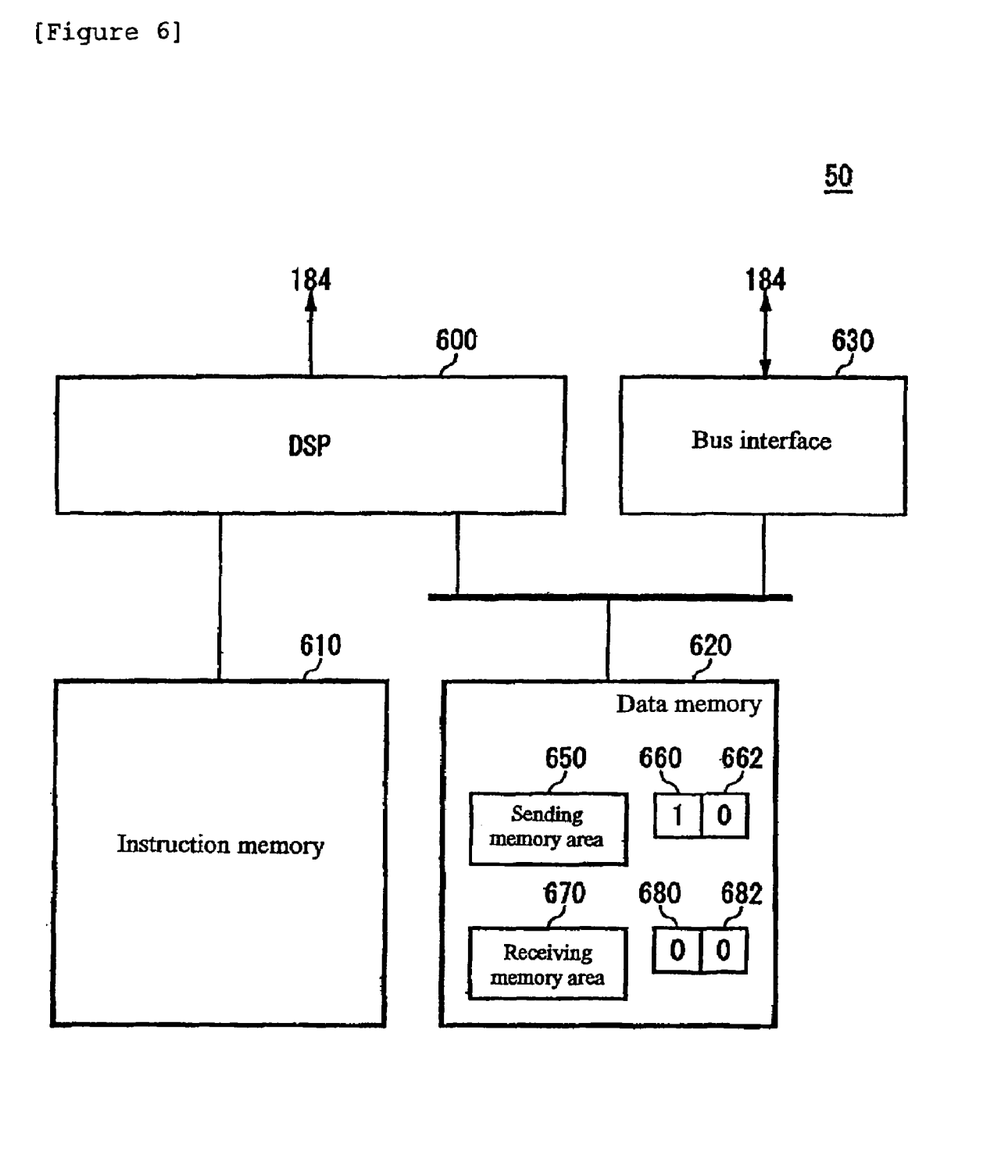
FIG. 6 shows an example of a hardware configuration of an information processing subsystem according to an embodiment of the present invention.

FIG. 6 shows an example of a hardware configuration of the information processing subsystem 50 according to the present embodiment. The information processing subsystem 50 includes a DSP 600, an instruction memory 610, a data memory 620, and a bus interface 630.

The DPS 600 operates according to programs stored in the instruction memory 610 to accomplish information processing in cooperation with the CPU 100. The instruction memory 610 stores a program for causing the information processing subsystem 50 to function as the object acquiring unit 200, the interrupt issuing unit 210, the use delay unit 220, and the timing control unit 226. The data memory 620 stores data used by the DSP 600. The bus interface 630 enables data transfer between the information processing subsystem 50 and the input/output controller 184.

A program installed in the instruction memory 610 in the information processing subsystem 50 and executed to cause the information processing subsystem 50 to function as the data generation device 60, the resource reservation device 70, and the interrupt control device 80 comprises a data generation module, a resource reservation module, an object acquiring module, an interrupt issuing module including setup period management module, a use delay module including a delay time calculation module and delay processing module, and a timing control module including a time difference measuring module, acquisition time measuring module, and setup period change module. These programs or modules cause the information processing subsystem 50 to function as the data generation device 60, resource reservation device 70, object acquiring unit 200, the interrupt issuing unit 210 including the setup period management unit 212, the use delay unit 220 including the delay time calculation unit 222 and delay processing unit 224, and the timing control unit 226 including the time difference measuring unit 230, acquisition time measuring unit 240, and setup period change unit 250. The programs or modules described above are loaded into the instruction memory 610 from the input/output controller 184 through the bus interface 630.

The data memory 620 includes a sending memory area 650, an availability flag 660, a delay indication flag 662, a receiving memory area 670, an availability flag 680, and a delay indication flag 682, which are managed by the object acquiring unit 200.

The sending memory area 650 stores data generated by the data generation device 60 and obtained by the object acquiring unit 200. The data stored in the sending memory area 650 is to be sent from the information processing subsystem 50 to the CPU 100.

The availability flag 660 is a location in which a flag value of "1", which indicates that data to be sent to the CPU 100 is available, is written by the object acquiring unit 200 when the data is stored in the sending memory area 650.

The delay indication flag 662 is a location in which a flag value of "1", which indicates that a delay time calculated by the delay time calculation unit 222 in the generation of data to be stored in the sending memory area 650 is equal to or greater than a threshold, is written by the delay processing unit 224.

The receiving memory area 670 is a resource reserved by the data generation device 60 and acquired by the object acquiring unit 200 and stores data received from the CPU 100.

The availability flag 680 is a location in which a flag value of "1", which indicates that the receiving memory area 670 is available for storing data received from the CPU 100, is written by the object acquiring unit 200 when that resource has become available.

The delay indication flag 682 is a location in which a flag value of "1", which indicates that a delay time calculated by the delay time calculation unit 222 in the reservation of the receiving memory area 670 is equal to or greater than a threshold, is written by the delay processing unit 224.

The information processing subsystem 50 operates as described below to send data to the CPU 100. First, at step S300 in FIG. 3, the delay processing unit 224 writes in the availability flag 660 a flag value of "0" indicating that data is not available and also writes a flag value of "1" in the delay indication flag 662. As a result, the delay processing unit 224 indicates to the CPU 100, which refers to the availability flag 660 and the delay indication flag 662 through the bus interface 630, that all of the data is not stored in the sending memory 650 and therefore the use of the data should be delayed because the data is not available, and the delay time is equal to or greater than the threshold and therefore the CPU 100 should wait for a re-interrupt.

The delay processing unit 224 writes "0" in the delay indication flag 662 when the delay time becomes below the threshold. Thus, the delay processing unit 224 indicates to the CPU 100 that the delay time is less than the threshold and the CPU 100 should request the data by polling and so as to delay using the data.

After the object acquiring unit 200 acquires the data and stores it in the sending memory area 650, the delay processing unit 224 writes the flag value "1" in the availability flag 660. Thus, the delay processing unit 224 indicates to the CPU 100, which refers to the availability flag 660 and the delay indication flag 662 through the bus interface 630, that the data is stored in the sending memory and is available.

On the other hand, in the case where the information processing subsystem 50 receives data from the CPU 100, the information subsystem 50 operates as follows. First, the delay processing unit 224 writes a flag value of "0" in the availability flag 680 to indicate that the resource is not available to the CPU 100 and writes a flag value of "1" in the delay indication flag 682. Thus, the delay processing unit 224 indicates to the CPU 100, which refers to the availability flag 680 and the delay indication flag 682 through the bus interface 630, that the receiving memory area 670 is not available and therefore the CPU 100 should delay using that resource and the delay time is greater than or equal to the threshold and therefore the CPU 100 should wait a re-interrupt.

When the delay time becomes less than the threshold, the delay processing unit 224 writes the value "0" in the delay indication flag 682. Thus, the delay processing unit 224 indicates to the CPU 100 that the delay time is less than the threshold and the CPU 100 should requests the resource by polling to delay using that resource.

When the object acquiring unit 200 acquires the receiving memory area 670 and the resource becomes available, the delay processing unit 224 write the flag value "1" in the availability flag 680. Thus, the delay processing unit 224 indicates to the CPU 100, which refers to the availability flag 680 and the delay indication flag 682, that the receiving memory area 670 is made available and the CPU 100 can writes data in the receiving memory area 670.

While the present invention has been described with respect to the illustrated embodiments thereof, the technical scope of the present invention is not limited to the embodiments shown. As will be obvious to those skilled in the relevant arts, various changes or improvements can be made to the embodiments. It will be appreciated from the claims that embodiments to which such changes or improvements are made also fall within the scope and spirit of the present invention.

For example, if the hardware configuration of the information subsystem 50 includes input/output devices and a DMA controller but not includes an instruction processing device such as a CPU or DSP, the programs or modules that implement the use delay unit 220 and/or the timing control unit 226 may be executed on the CPU 100.

In that case, the CPU 100 functions as the use delay unit 220 in interrupt handling and determines whether or not it should delay using data or resource. The CPU 100 may choose to request the use of the data or resource by polling in interrupt handling or to perform operations which would be performed by the use delay unit 220 and the setup period change module 250 to set a re-interrupt and then return from the interrupt handling.

Furthermore, the CPU 100 may function as the timing control unit 226 to change the setup period depending on whether the object acquiring unit 200 has acquired data or resource when requesting the use of the data or resource in interrupt handling.

Moreover, the information processing subsystem 50 may issue an interrupt to the CPU 100 to request data or resource before using the data or resource, thereby masking the latency until it uses the data or resource.

That is, the interrupt issuing unit 210 issues an interrupt to the CPU 100 to request the use of the data or resource before a processing device such as a DSP 600 in the information processing subsystem 50 uses the data or resource. Then, the use delay unit 220 delays the use of the data or resource by the processing device if the processing device requests the use of the data or the resource before the CPU 100 makes the data or resource available to the processing unit.

The timing control unit 226 may control the timing of issuing the interrupt in a manner similar to step S370 in FIG. 3.

Furthermore, the information processing subsystem 50 may be a different information processing device provided separately from the information processing device 10 and operating in communication with the information processing device 10.

What is claimed is:

1. An interrupt control device for issuing interrupts to a central processing unit, comprising:
    an object acquiring unit for acquiring data for use by said central processing unit;
    an interrupt issuing unit for issuing an interrupt to said central processing unit before said object acquiring unit acquires said data, after a predetermined setup period elapses from when a data generation device generating said data starts to generate said data, wherein said data generation device generates a plurality of data segments, wherein said object acquiring unit sequentially acquires said plurality of data segments for use by said central processing unit, and wherein said interrupt issuing unit issues an interrupt to said central processing unit before said object acquiring unit acquires each of said plurality of data segments, each said interrupt indicating that the respective one of said plurality of data segments has become available; and
    a use delay unit for delaying use of said data by said central processing unit until said object acquiring unit acquires said data if said central processing unit which has received said interrupt requests use of said data before said object acquiring unit acquires said data,
    a time difference measuring unit for measuring a time difference between when said object acquiring unit acquires said data and when said central processing unit which has received said interrupt requests use of said data, wherein said time difference measuring unit measures, for each of said plurality of data segments, a time difference between when said object acquiring unit acquires said data segment and when said central processing unit which has received said interrupt requests use of said data segment; and
    a setup period change unit for changing said predetermined setup period according to said time difference, wherein said setup period change unit changes said setup period according to the time differences measured by said time difference measuring unit.

2. The interrupt control device according to claim 1, wherein said setup period change unit changes said setup period according to an average of the time differences measured by said time difference measuring unit.

3. The interrupt control device according to claim 2, wherein said setup period change unit changes said setup period to make said average a predetermined small value, said predetermined small value being small compared to an average time between an interrupt being issued and said central processing unit which has received said interrupt requesting use of said data segment.

4. The interrupt control device according to claim 1, wherein said setup period change unit changes said setup period to cause an average value of a distribution of said time differences measured by said time difference measuring unit to become substantially zero.

5. The interrupt control device according to claim 4, wherein said setup period change unit changes said setup period to make a predetermined percentage of said time differences less than or equal to a predetermined value, wherein said predetermined value is approximately zero.

6. An information processing device comprising a central processing unit and an interrupt control device that issues an interrupt to said central processing unit, wherein said interrupt control device comprises:
    an object acquiring unit for acquiring data for use by said central processing unit;
    an interrupt issuing unit for issuing an interrupt to said central processing unit before said object acquiring unit acquires said data, after a predetermined setup period elapses from when a data generation device generating said data starts to generate said data, wherein said data generation device generates a plurality of data segments, wherein said object acquiring unit sequentially acquires said plurality of data segments for use by said central processing unit, and wherein said interrupt issuing unit issues an interrupt to said central processing unit before said object acquiring unit acquires each of said plurality of data segments, each said interrupt indicating that the respective one of said plurality of data segments has become available
    a use delay unit for delaying use of said data by said central processing unit until said object acquiring unit acquires said data if said central processing unit which has received said interrupt requests use of said data before said object acquiring unit acquires said data,
    a time difference measuring unit for measuring a time difference between when said object acquiring unit acquires said data and when said central processing unit which has received said interrupt requests use of said data, wherein said time difference measuring unit measures, for each of said plurality of data segments, a time difference between when said object acquiring unit acquires said data segment and when said central processing unit which has received said interrupt requests use of said data segment; and
    a setup period change unit for changing said predetermined setup period according to said time difference, wherein said setup period change unit changes said setup period according to the time differences measured by said time difference measuring unit.

7. The information processing device according to claim 6, wherein said setup period change unit changes said setup period according to an average of the time differences measured by said time difference measuring unit.

8. The information processing device according to claim 7, wherein said setup period change unit changes said setup period to make said average a predetermined small value, said predetermined small value being small compared to an average time between an interrupt being issued and said central processing unit which has received said interrupt requesting use of said data segment.

9. The information processing device according to claim 6, wherein said setup period change unit changes said setup period to cause an average value of a distribution of said time differences measured by said time difference measuring unit to become substantially zero.

10. The information processing device according to claim 9, wherein said setup period change unit changes said setup period to make a predetermined percentage of said time differences less than or equal to a predetermined value, wherein said predetermined value is approximately zero.

11. A method comprising:
    generating a plurality of data segments within a data generation device;
    sequentially acquiring said plurality data segments within an object acquiring unit for use within a central processing unit;
    issuing an interrupt for each of said plurality of data segments from an interrupt issuing unit within an interrupt control device to a central processing unit after a predetermined setup period elapses from when said data generation device starts to generate said plurality of data segments, and before said object acquiring unit acquires each of said plurality of data segments; wherein each said interrupt indicates that one of said data segments has become available;

delaying use of said data by said central processing unit until said object acquiring unit acquires said data if said central processing unit, having received said interrupt, requests use of said data before said object acquiring unit acquires said data;

measuring a time difference between when said object acquiring unit acquires said data and when said central processing unit, having received said interrupt requests use of said data, wherein, for each of said plurality of data segments, a time difference is measured between when said object acquiring unit acquires said data segment and when said central processing unit which has received said interrupt requests use of said data segment; and changing said predetermined setup period according to said time difference, wherein said setup period is changed according to the time differences measured between when said object acquiring unit acquires said data segment and when said central processing unit which has received said interrupt requests use of said data segment.

12. The method according to claim 11, wherein said setup period is changed according to an average of the time differences measured by said time difference measuring unit.

13. The method according to claim 12, wherein said setup period is changed to make said average a predetermined small value, said predetermined small value being small compared to an average time between an interrupt being issued and said central processing unit, having received said interrupt, requesting use of said data segment.

14. The method according to claim 11, wherein said setup period is changed to cause an average value of a distribution of said time differences measured by said time difference measuring unit to become substantially zero.

15. The method according to claim 14, wherein said setup period is changed to make a predetermined percentage of said time differences less than or equal to a predetermined value, wherein said predetermined value is approximately zero.

* * * * *